US011865679B2

(12) United States Patent
Seith et al.

(10) Patent No.: US 11,865,679 B2
(45) Date of Patent: Jan. 9, 2024

(54) BATTERY POWERED IMPACT WRENCH

(71) Applicant: INGERSOLL-RAND INDUSTRIAL U.S., INC., Davidson, NC (US)

(72) Inventors: Warren A. Seith, Bethlehem, PA (US); Justin T. Chellew, Bethlehem, PA (US); Nicholas Garibaldi, Princeton, NJ (US); Kevin M. Purdy, Westfield, NJ (US); Mark T. McClung, Andover, NJ (US); Madan Kumar Mandal, Bangalore (IN)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 806 days.

(21) Appl. No.: 16/599,325

(22) Filed: Oct. 11, 2019

(65) Prior Publication Data

US 2021/0107120 A1 Apr. 15, 2021

(51) Int. Cl.

| | |
|---|---|
| ***B25B 21/02*** | (2006.01) |
| ***B25F 5/02*** | (2006.01) |
| ***B25D 17/04*** | (2006.01) |
| ***B25D 17/06*** | (2006.01) |

(52) U.S. Cl.

CPC ............ *B25B 21/023* (2013.01); *B25D 17/04* (2013.01); *B25D 17/06* (2013.01); *B25F 5/02* (2013.01); *B25D 2211/006* (2013.01); *B25D 2211/06* (2013.01); *B25D 2216/0007* (2013.01); *B25D 2217/0015* (2013.01)

(58) Field of Classification Search

USPC ........................................................... 81/464

See application file for complete search history.

(56) References Cited

U.S. PATENT DOCUMENTS

| | | | |
|---|---|---|---|
| 4,930,583 | A | 6/1990 | Fushiya et al. |
| 5,445,479 | A | 8/1995 | Hillinger |
| 7,490,746 | B2 | 2/2009 | Sakai et al. |
| 8,205,684 | B2 | 6/2012 | Kokinelis et al. |
| 8,353,362 | B2 | 1/2013 | Liebhard et al. |
| 8,517,558 | B2 | 8/2013 | Oomori et al. |
| 9,505,120 | B2 | 11/2016 | Aoki et al. |
| 9,555,537 | B2 | 1/2017 | Iwata et al. |
| 9,713,880 | B2 | 7/2017 | Haneda et al. |

(Continued)

FOREIGN PATENT DOCUMENTS

| | | |
|---|---|---|
| CN | 101817177 A | 9/2010 |
| CN | 205765876 U | 12/2016 |

(Continued)

OTHER PUBLICATIONS

Notification of Reasons for Refusal in Japanese Application No. 2020-168597, dated Sep. 14, 2021.

(Continued)

*Primary Examiner* — Tanzim Imam

(74) *Attorney, Agent, or Firm* — Kevin E. West; Advent, LLP

(57) ABSTRACT

An impact wrench is provided with a battery to power the motor. The impact wrench provides improved portability since the impact wrench does not need to be connected to an electrical extension cord or a pneumatic hose. The output drive, motor, batteries and main handle may be aligned along the axial direction of the tool. The batteries may be located between the motor and the main handle.

20 Claims, 7 Drawing Sheets

(56) References Cited

U.S. PATENT DOCUMENTS

| | | | | |
|---|---|---|---|---|
| 9,849,577 | B2 | 12/2017 | Wyler et al. | |
| 10,695,943 | B2 | 6/2020 | Kachi et al. | |
| 2013/0228356 | A1* | 9/2013 | Hayes | B23P 15/00 173/90 |
| 2013/0327554 | A1* | 12/2013 | Hyma | B25F 5/02 173/47 |
| 2014/0190717 | A1* | 7/2014 | Simpson | B25F 5/02 29/428 |
| 2015/0053448 | A1* | 2/2015 | Busschaert | B25F 5/02 173/217 |
| 2015/0104250 | A1* | 4/2015 | Tada | H01M 50/20 403/375 |
| 2015/0251258 | A1 | 9/2015 | Jiang et al. | |
| 2015/0328764 | A1 | 11/2015 | Yoshinkane et al. | |
| 2016/0131353 | A1* | 5/2016 | Bartoszek | B25F 5/008 362/119 |
| 2017/0203462 | A1* | 7/2017 | Haneda | B27B 17/08 |
| 2018/0200917 | A1* | 7/2018 | Kachi | B27B 17/0008 |
| 2018/0207831 | A1* | 7/2018 | Masatoshi | B25F 5/02 |
| 2019/0255687 | A1* | 8/2019 | Schneider | B25B 21/02 |

FOREIGN PATENT DOCUMENTS

| | | | | |
|---|---|---|---|---|
| CN | 106457595 | A | 2/2017 | |
| CN | 107107324 | A | 8/2017 | |
| DE | 202008014976 | U1 | 2/2009 | |
| DE | 112016001201 | T5 | 12/2017 | |
| EP | 2223778 | A2 | 9/2010 | |
| EP | 2926647 | A1 | 10/2015 | |
| JP | S6222087 | A | 1/1987 | |
| JP | S6222087 | U | 2/1987 | |
| JP | 2010200751 | A | 9/2010 | |
| JP | 2013188822 | A | 9/2013 | |
| JP | 2013188822 | A * | 9/2013 | |
| JP | 2016022675 | A | 2/2016 | |
| JP | 2016087740 | A | 5/2016 | |
| JP | 2017019224 | A | 1/2017 | |
| JP | 2017113809 | A | 6/2017 | |
| WO | WO-2014119126 | A1 * | 8/2014 | B25F 5/00 |
| WO | 2017110229 | A1 | 6/2017 | |

OTHER PUBLICATIONS

Makita, New Tool Overview XCU03PT1, found at makitatools.com, Aug. 16, 2019, 1 page.

Office Action for Chinese Application No. 202011084069.9, dated Mar. 11, 2022.

Extended EuropeanSearch Report for Application No. 20199769.9, dated Feb. 8, 2021.

* cited by examiner

BATTERY POWERED IMPACT WRENCH

BACKGROUND

The present inventions relate generally to impact wrenches, and more particularly, to an impact wrench powered by a battery.

Impact wrenches are known power tools that are commonly used to tighten fasteners but may have other uses as well. While there are many types of mechanisms that may be used in an impact wrench, the tool typically has a hammer that periodically engages and disengages with an anvil. This results in impact forces being transmitted from the hammer to the anvil, which is useful for a variety of purposes.

Many impact wrenches are designed in a conventional fashion where the handle extends below the motor in a pistol-type configuration. In these cases, when an impact wrench is battery powered, the battery is typically located at the bottom of the handle. While this design is common and useful, it is most suitable for smaller impact tools. Larger impact tools may require different configurations in order to adequately hold and control the tool. For example, large impact tools may be used in high torque applications, such as tightening and loosening heavy truck wheel fasteners.

Thus, the inventions disclosed herein are directed to improved features of a non-pistol type impact wrench.

SUMMARY

An impact wrench is described that may be used for heavy truck wheel fasteners. Preferably, the impact wrench has a 1" output drive. The impact wrench is battery powered to provide complete portability. The main handle of the impact wrench is located behind the output drive and the motor. The battery may be located between the motor and the handle. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
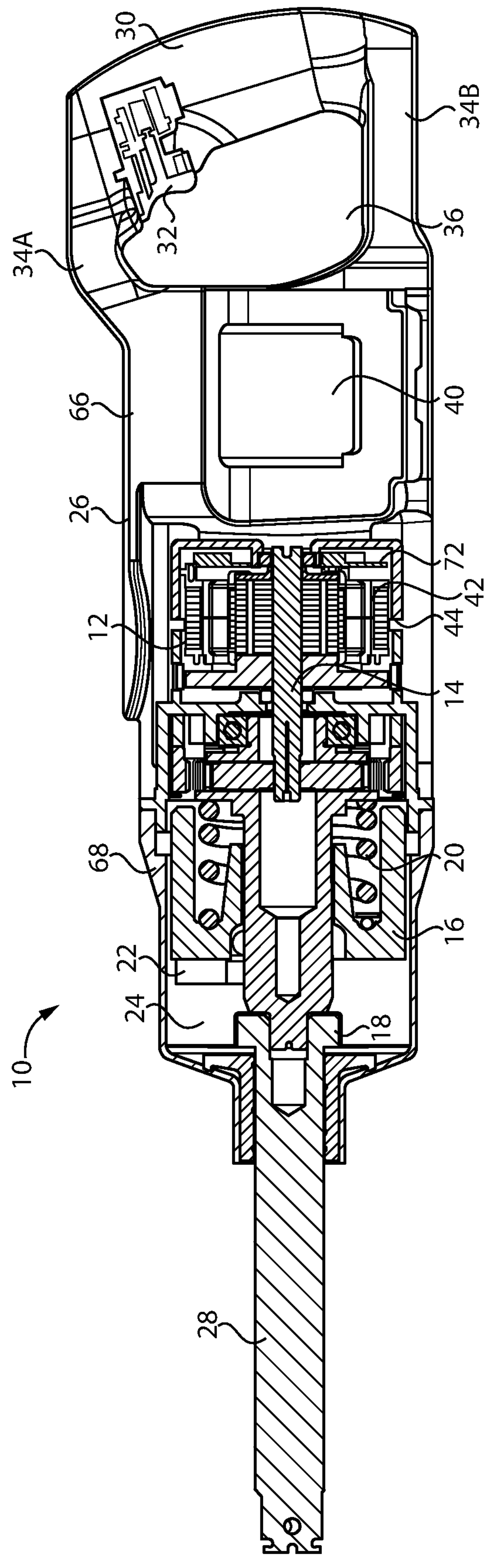
FIG. 1 is a partial cross-sectional view of an impact wrench.

Referring now to the figures, and particularly FIG. 1, the cross-section of an impact tool 10 is shown. Impact tools are known in the art and the particular arrangement of components may vary significantly from tool to tool. Thus, only a general description of the components of the impact tool 10 are necessary for an understanding of the inventions herein. Commonly, the components of the impact tool 10 include a motor 12 that provides the rotational drive for the tool 10. The output shaft 14 of the motor 12 may be connected to a hammer 16 through various gearing and/or cam arrangements. In the embodiment shown in FIG. 1; the hammer 16 is biased forward toward the anvil 18 by a spring 20. During operation, the hammer 16 reciprocates axially back-and-fourth and rotationally in response to the drive torque of the motor 12.

The hammer 16 may have a drive member 22 that is engageable with a drive member of the anvil 18. In FIG. 1; the drive member 22 of the hammer 16 is one or more frontal protrusions 22 that extend axially toward the anvil 18, and the drive members of the anvil 18 are wings (not shown in FIG. 1 because they are extending in and out of the paper) that extend radially with circumferential space 24 therebetween for the protrusions 22 of the hammer 16 to fit within. As the motor 12 drives the hammer 16, the protrusion 22 of the hammer 16 periodically engages and disengages with the wings of the anvil 18. This causes impact torques to be applied to the anvil 18 such that the hammer 16 rotationally drives the anvil 18 when the drive members 22 are in engagement and the hammer 16 rotates relative to the anvil 18 during disengagement. The anvil 18 extends out the front of the tool housing 26 to provide an output drive 28 that may be connected to a socket to engage a fastener to be tightened or loosened. It is understood that the impact mechanism shown and described is only one type of impact mechanism that may be used and that different types of impact mechanisms may also be used, such as swinging weight mechanisms, Maurer mechanisms, rocking dog mechanisms, ski-jump mechanisms and pin-style mechanisms.

Although the inventions described herein may be used in various impact tools and power tools, the described arrangement is particularly suited for 1" impact wrenches 10 which are commonly used to tighten and loosen heavy truck wheel fasteners. One desirable feature of the tool 10 is that the cross-sectional profile of the tool 10 should be narrow while the length of the tool 10 may be relatively long. The reason for this arrangement is that the tool 10 may need to reach deep into a wheel well to reach a fastener and there may not be substantial radial clearance to fit a tool 10 in the wheel well while connected to a fastener. In view of the deep reach that may be needed to reach a fastener within a wheel well, it may be desirable for the output drive 28 to extend past the end of the tool housing 26 at least 5" or more.

Traditional pistol-type impact wrenches are not the preferred type of tool to use for heavy truck wheel fasteners. Instead, it is preferred that the main handle 30 be located behind the output drive 28. This allows the user to push and pull the tool 10 directly relative to the output drive 28 without producing rotational movement or torque therebetween. Since the main handle 30 also includes a trigger switch 32 to turn the motor 12 on and off, this means that the trigger switch 32 will typically be located above the bottom of the motor 12 and above the bottom of the output drive 28. The main handle 30 is also preferably attached to the tool housing 26 with top and bottom supports 34A, 34B so that a finger opening 36 is formed which is fully circumscribed by the main handle 30, top and bottom supports 34A, 34B and the tool housing 26. Thus, the user may insert his fingers through the finger opening 36 to wrap his hand around the main handle 30 and engage the trigger switch 32 with one of his fingers on the inside of the finger opening 36.

In the tool 10 described herein, it is preferred for the motor 12 to be oriented in the same axial direction as the tool 10 itself. That is, the central axes of the motor 12 and the output drive 28 extend in the same direction and are thus parallel to each other. Thus, like the rotational axis of the output drive 28, which extends out the front of the tool 10, the output shaft 14 of the motor 12 is also oriented toward the front and rear of the tool 10, In the most preferred arrangement, the output drive 28 of the tool 10 and the output shaft 14 of the motor 12 are coaxial with each other.

Preferably, the impact wrench 10 includes one or more batteries 38 to supply power to the motor 12. Thus, unlike many 1" impact wrenches used for heavy truck wheel fasteners, the tool 10 does not need to be connected to an electric extension cord or a pneumatic hose for power. Thus, the tool 10 is completely portable. In order to achieve a desired shape of the tool 10 (i.e., cross-sectionally narrow and axially long), it is preferred for the batteries 38 to be located between the output drive 28 and the main handle 30. Thus, the output drive 28, motor 12, batteries 38 and main handle 30 are aligned between the front and rear of the tool 10. As a result, the battery 38 and main handle 30 are located behind the motor 12 and the output drive 28. As shown in FIG. 1, the battery dock 40 is most preferably between the stator 42 of the motor 12 and the main handle 30.

Figure 2:
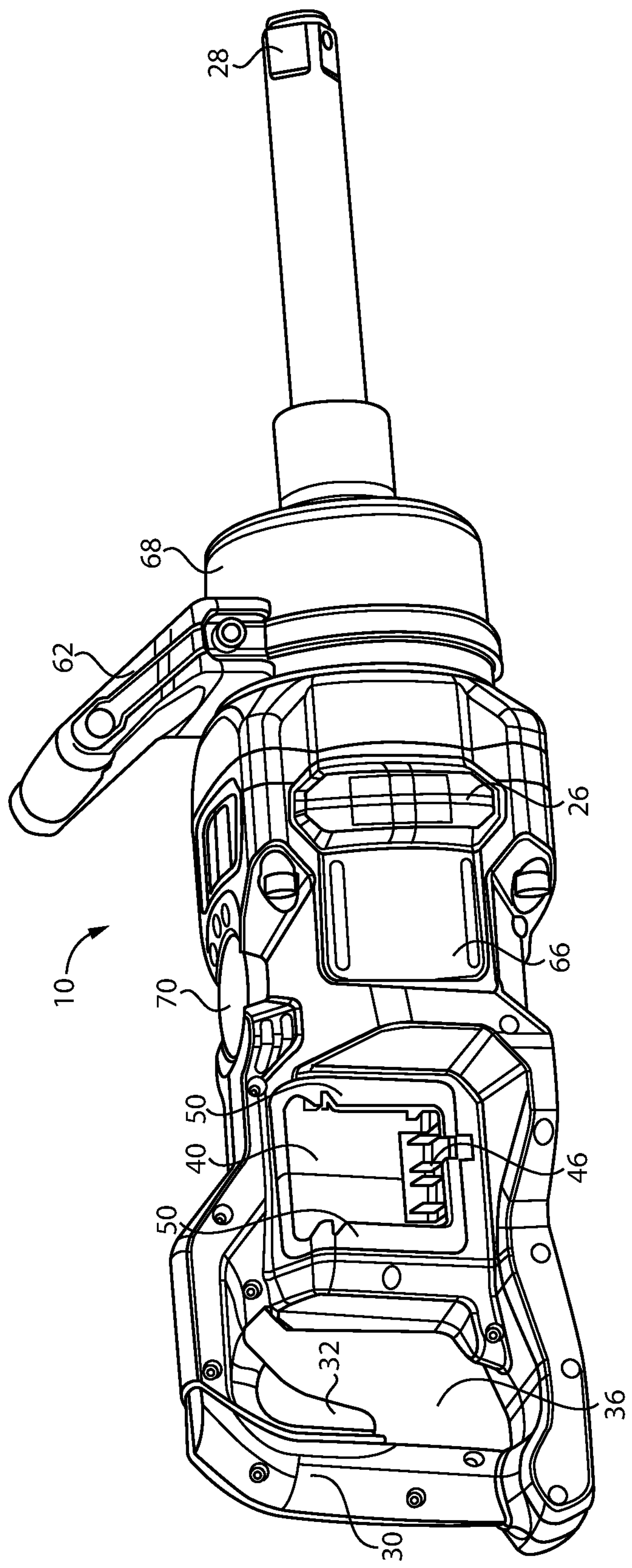
FIG. 2 is a side perspective view of another impact wrench.
Figure 4:
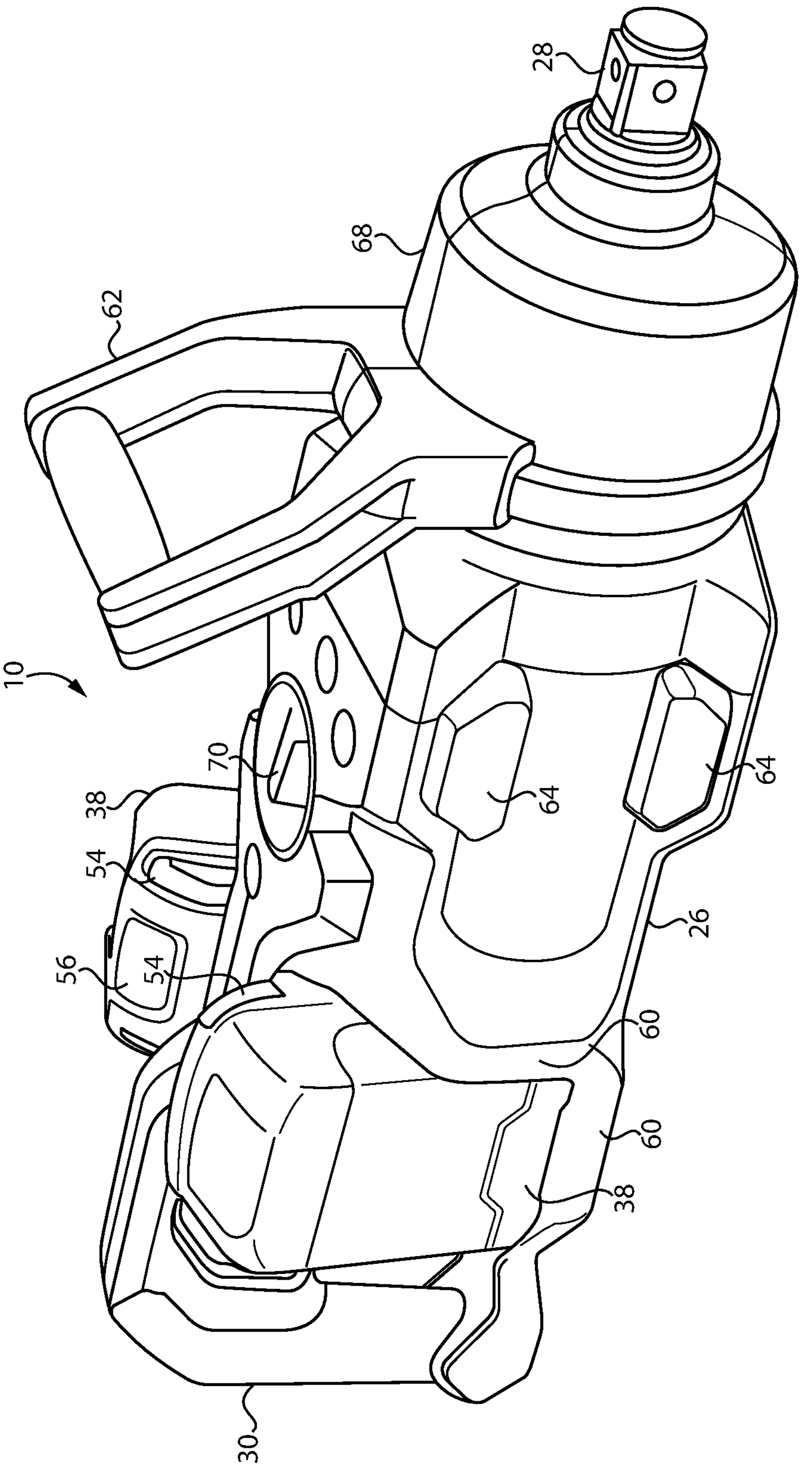
FIG. 4 is a side perspective view of the impact wrench of FIG. 3.
Figure 7:
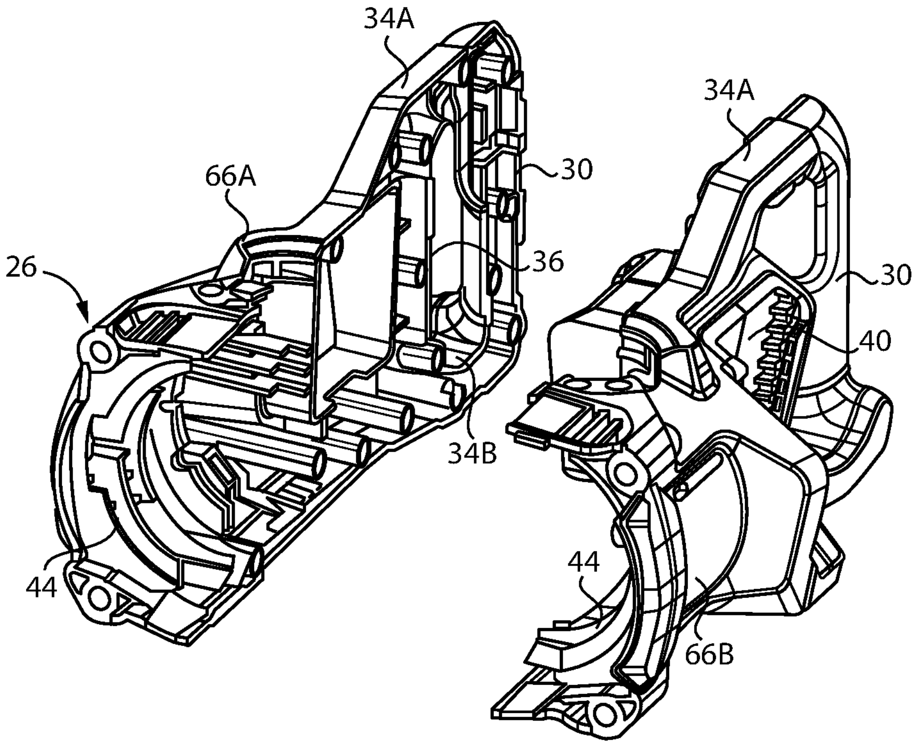
FIG. 7 is an exploded view of a two-piece tool housing.
Figure 8:
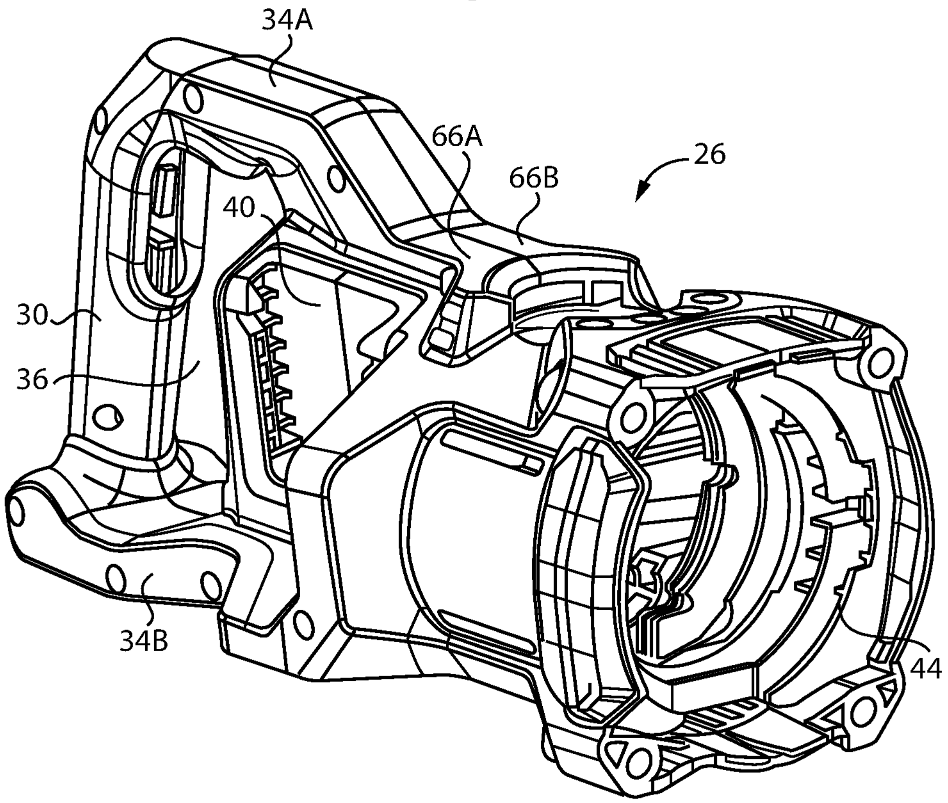
FIG. 8 is a perspective view of the two-piece tool housing of FIG. 7.

As shown in FIGS. 2 and 4, an advantage of this arrangement is that the batteries 38 between the motor 12 and the handle 30 may be squeezed in closer toward the center of the tool 10 to minimize the circumferential size of the batteries on the tool. That is, the stator 42 of the motor 12 requires a substantial circumferential space. Thus, if the handle 30 were located immediately behind the motor 12, the batteries 38 could alternatively be mounted outside of the stator 42 of the motor 12. However, this would cause the batteries 38 to be located very wide and would be undesirable. Instead, in the preferred embodiment, as shown in FIGS. 7-8, the tool housing 26 has a motor opening 44 within which the stator 42 is enclosed. The opening 44 defines the outer circumference of the stator 42. In order to minimize the width of the tool 10, the battery docks 40 may be located on a lateral side of the tool 10 laterally within the outer boundary of the motor opening 44. Thus, as shown in FIG. 4, the outer surface of the battery 38 need not extend significantly beyond the outer surface of the tool housing 26 around the stator 42.

Figure 6:
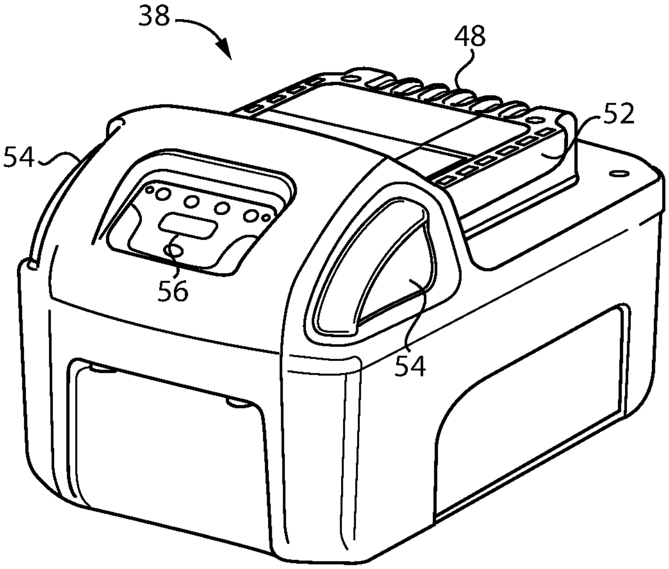
FIG. 6 is a perspective view of a battery.

As shown in FIGS. 2 and 6, the battery dock 40 has electrical connectors 46 that engage with corresponding electrical connectors 48 on the battery 38. The battery dock 40 also has guide rails 50 that the battery 38 guide rails 52 are slid into to connect the battery 38 to the battery dock 40. As shown in FIG. 6, the battery 38 has release buttons 54 to disengage a lock that locks the battery 38 to the battery dock 40 when the battery 38 guide rails 52 are fully inserted into the battery dock 40 guide rails 50, The battery 38 also has a charge level display 56 between the push buttons 54, which is exposed at the top of the tool 10 and faces inward (FIG. 4) when the battery 38 is connected to the battery dock 40. It is understood from the foregoing description that the battery 38 is connected to the tool 10 by sliding the battery 38 down from the top of the tool 10 into the guide rails 50 until the battery 8 guide rails 52 hit the bottom of the battery dock 40 guide rails 50 at which point a lock locks the battery 38 and tool 10 together.

Figure 5:
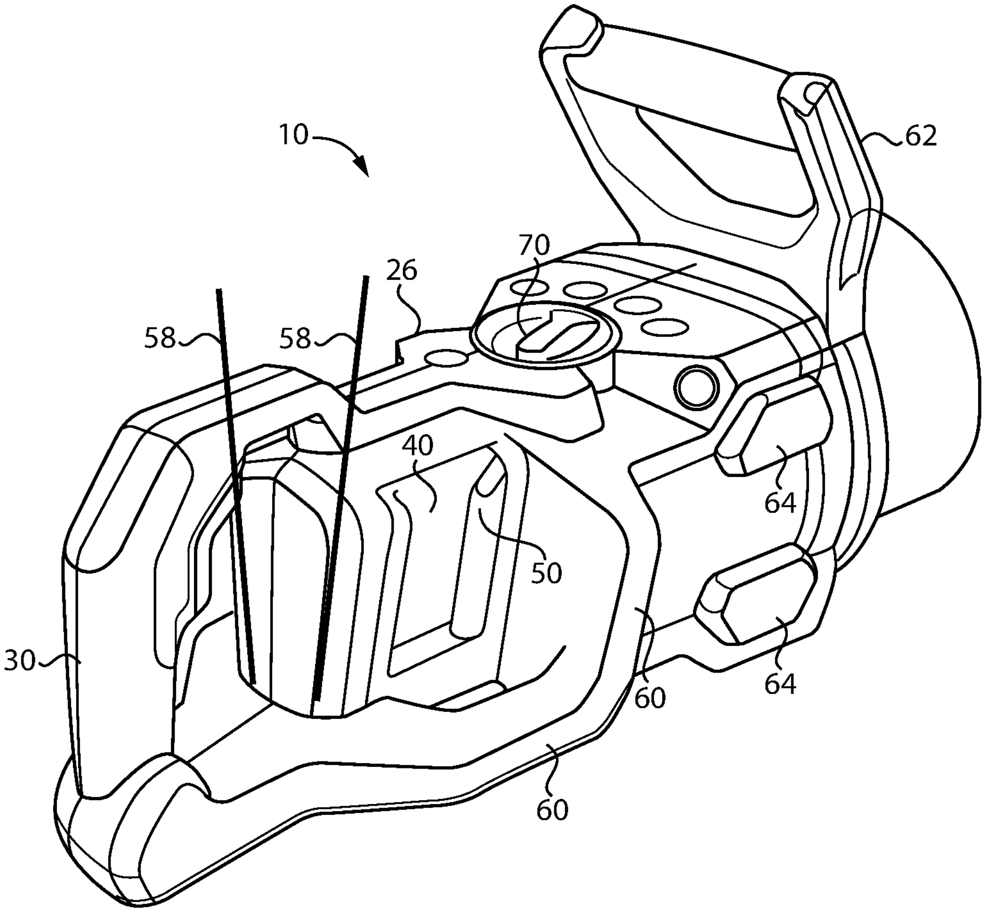
FIG. 5 is a rear perspective view of the impact wrench of FIG. 3.

As shown in FIG. 4, the tool 10 preferably has two batteries 38 on opposite lateral sides of the tool 10. As shown in FIG. 5, it may be preferred for the two battery docks 40 to be oriented at an angle relative to each other. Thus, the battery dock 40 guide rails 52 of the two docks 40 may be oriented in a V-shape 58 with the top of the guide rails 52 spaced farther from each other than the bottom of the guide rails 52.

As shown in FIGS. 4-5, it may also be desirable for the tool housing 26 to have one or more protective surfaces 60 adjacent to the battery 38 to protect the battery 38 during use. That is, the connection of the guide rails 50, 52 and the electrical connectors 46, 48 may not be designed to withstand substantial forces applied to the battery 38 during use of the tool 10. Thus, a protective surface 60 that extends outward at least to the outer surface of the battery 38 adjacent the battery 38 may be useful in preventing the battery 38 from contacting various objects during use of the tool 10 and damaging the battery 38, guide rails 50, 52 or electrical connectors 46, 48, Most preferably, the protective surface 60 extends outward past the outer surface of the battery 38. As shown in FIG. 4, at least two protective surfaces 60 may also be provided along a portion of two sides so that the protective surfaces 60 partially circumscribe the battery 38, Specifically, it may be desirable for the protective surfaces 60 to extend along the bottom of the battery 38 and along the front side of the battery 38.

Figure 3:
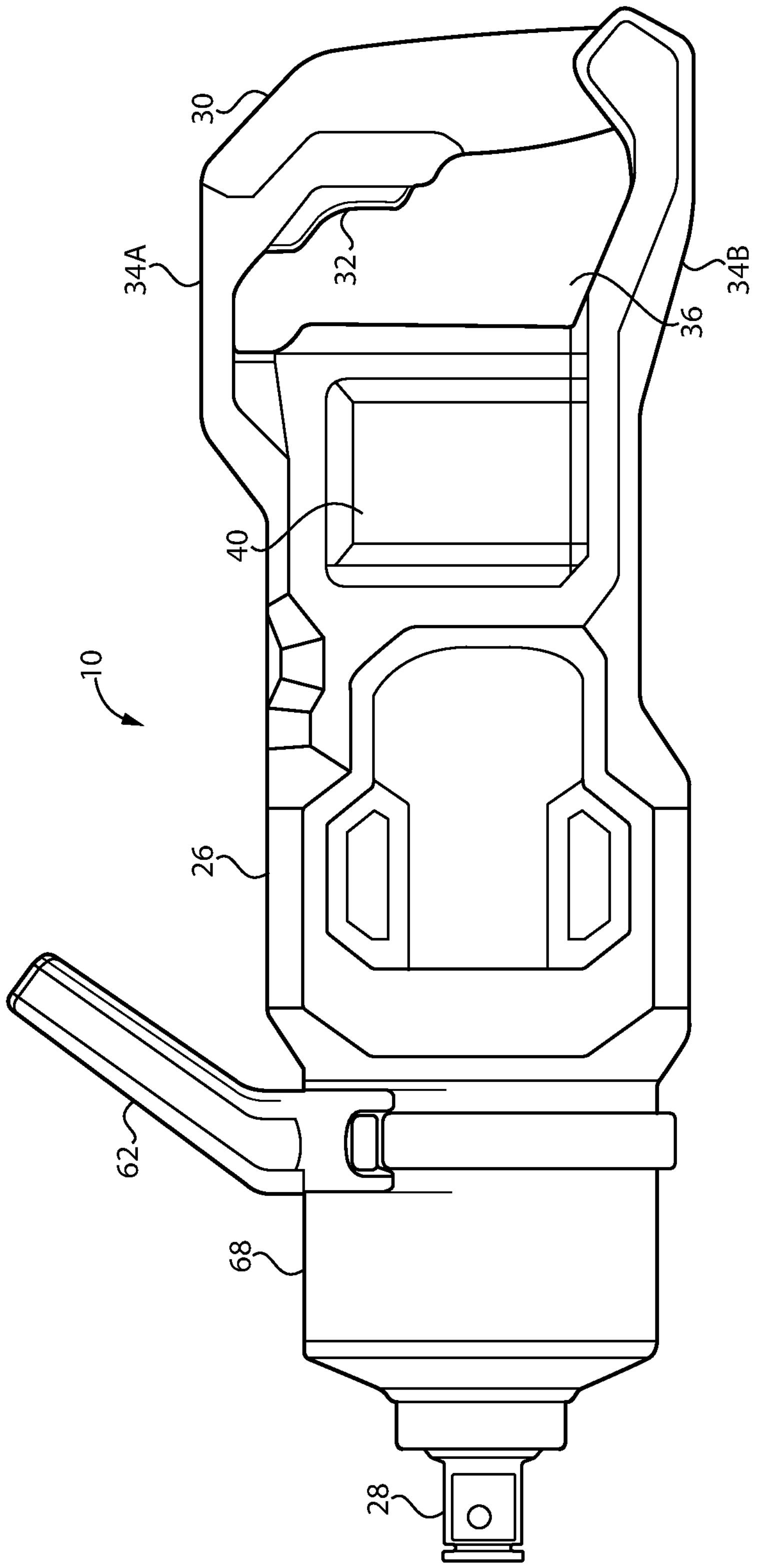
FIG. 3 is a side view of another impact wrench.

The protective surfaces 38 may be particularly useful as rest surfaces 60 for the tool 10. That is, although the tool 10 is shown resting in an upright position in FIGS. 3-4, it may not be unusual for the user to lay the tool 10 down on its side instead. It is noted, in particular, that the secondary handle 62 is rotatably adjustable around the circumference of the tool 10. Thus, it may be common for a user to orient the secondary handle 62 at 90° along one side of the tool 10, In this orientation, it may be more common for the user to lay the tool 10 down on its side. In this case, the protective surfaces 60 may be used as rest surfaces 60 to set the tool 10 down upon without the battery 38 contacting the support surface. It may also be desirable to provide a second rest surface 64 along the front of the tool 10 so that the tool 10 can be rested on its side on both the first and second rest surfaces 60, 64. As shown in FIG. 4, the second rest surface 64 may be one or more rest surfaces 64, like the first rest surface 60, if desired. As shown, the first and second rest surfaces 60, 64 are both flat and together form rest surfaces 60, 64 upon which the lateral side of the tool 10 may be rested without the battery 38 contacting the support surface, Preferably, the first and second rest surfaces 60, 64 are coplanar with each other. In order to provide a balanced support along the length of the tool 10, the first rest surfaces 60 are preferably located on the rear half of the tool 10 and the second rest surfaces 64 are preferably located on the front half of the tool 10.

As shown in FIGS. 7-8, it may be desirable for the rear portion 66 of the tool housing 10 (which forms the main handle 30, openings for the battery docks 40, and the motor opening 44) to be a two-piece housing 66A, 66B made of plastic. Since the impact mechanism experiences significant forces and vibrations, it may be preferred for the hammer 16 and anvil 18 to be enclosed within a metal hammer case 68 at the front of the tool 10 that fully circumscribes the impact mechanism with a single metal case 68.

Figure 9:
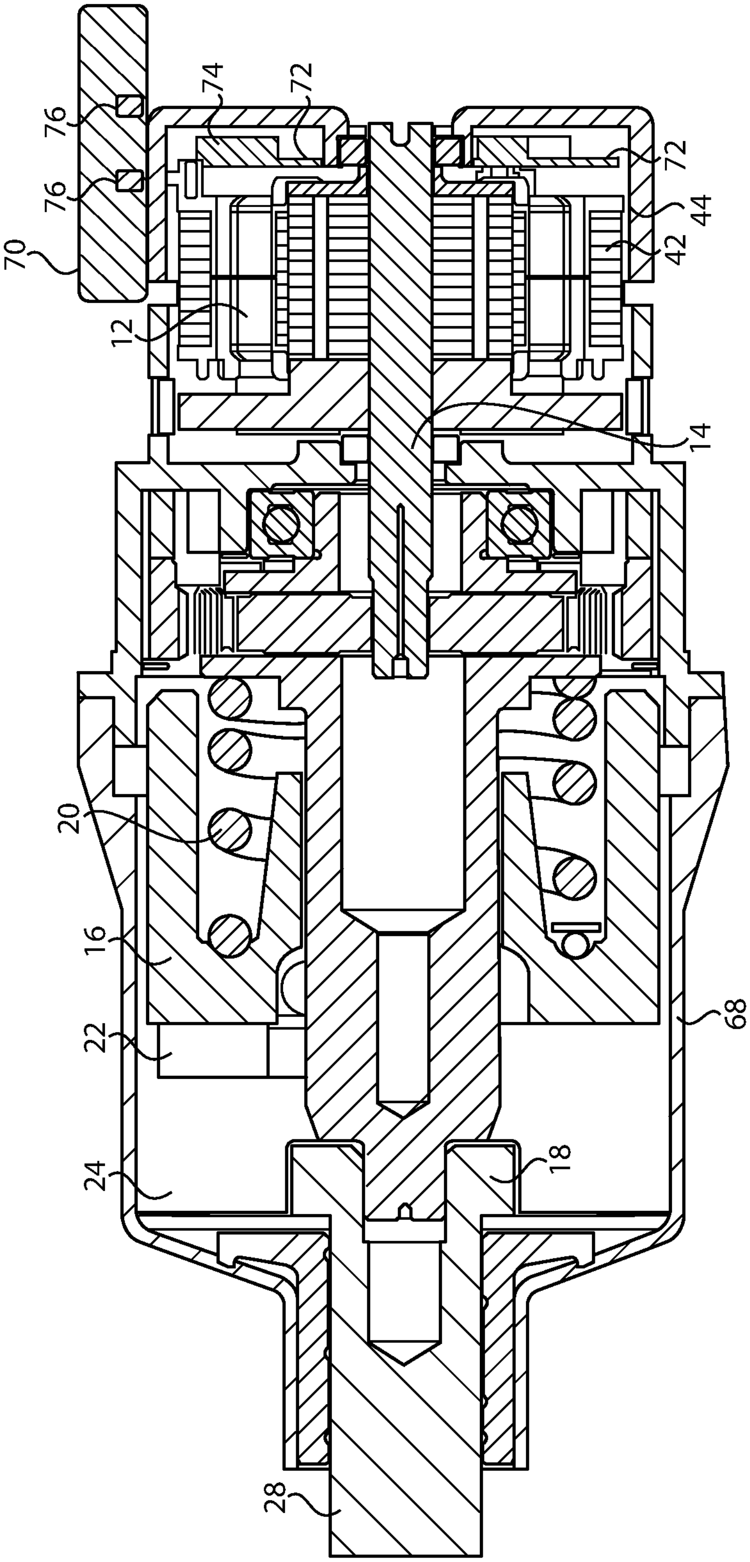
FIG. 9 is a cross-sectional view of an impact mechanism and drive motor.

As shown in FIGS. 4 and 9, it may also be desirable to provide an adjustable power regulator 70 adjacent the motor 12 for adjusting the power output of the motor 12. As shown, the power regulator 70 may be located on top of the tool 10 on the tool housing 26 where it is accessible to the user. Inside the two-piece plastic portion 66 of the tool housing 26, a motor drive circuit board 72 may be located behind the stator 42. In order to communicate the setting of the power regulator 70 to the motor drive circuit board 72, the circuit board 72 is provided with one or more Hall effect sensors 74 mounted directly thereon. The power regulator 70 is also provided with one or more magnets 76 mounted in the regulator 70. The Hall effect sensors 74 may then sense the position of the magnets 76 in order to determine the adjustment position of the power regulator 70, and the determined position may then be used directly by the circuit board 72 to control the motor 12.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. An impact wrench, comprising:

a longitudinal housing having a first end and a second end, the second end opposite to the first end;

a motor disposed within the longitudinal housing, the motor having an axis of rotation aligned with the longitudinal housing, the motor proximate to the first end of the housing, the motor having a stator with a cross-sectional profile that is perpendicular to the axis of rotation;

a motor opening disposed on the longitudinal housing, the motor opening defining an outer circumference of the stator;

a hammer comprising a first drive member rotatably driven by the motor;

an anvil comprising a second drive member; the first drive member of the hammer periodically engaging and disengaging the second drive member of the anvil such that the first and second drive members impact against each other;

an output drive rotatably driven by the anvil;

a first battery dock for receiving a first battery for supplying power to the motor;

a second battery dock for receiving a second battery for supplying power to the motor; and a handle disposed at the second end of the housing, the handle including a switch to turn the motor on and off;

wherein the first battery dock and the second battery dock are disposed between the motor and the handle and wherein the first battery dock and the second battery dock are disposed at opposite lateral sides from each other and fully within an outer boundary of the motor opening.

2. The impact wrench according to claim 1, wherein the first battery and the second battery are disposed between the stator of the motor and the handle.

3. The impact wrench according to claim 1, wherein the first battery, the second battery and the handle are disposed behind the motor and the output drive.

4. The impact wrench according to claim 1, wherein the switch is disposed above a bottom of the motor.

5. The impact wrench according to claim 1, wherein the switch is disposed above a bottom of the output drive.

6. The impact wrench according to claim 1, wherein the handle comprises a fully circumscribed finger opening.

7. The impact wrench according to claim 1, wherein the output drive is a 1" square drive.

8. The impact wrench according to claim 1, wherein central axes of the output drive and the motor are parallel to each other, a rotational axis of the output drive extending out of a front of the impact wrench.

9. The impact wrench according to claim 8, wherein the output drive and the motor are coaxial.

10. The impact wrench according to claim 1, wherein the housing is a two-piece housing enclosing opposite sides of the motor and defining the handle.

11. The impact wrench according to claim 10, further comprising a metal hammer case attached to a front end of the two-piece housing, the metal hammer case enclosing the hammer and the anvil.

12. The impact wrench according to claim 1, wherein the first battery dock and the second battery dock comprise electrical connectors and guide rails, the first battery and the second battery being slid down into the first battery dock and the second battery dock, respectively, to couple the first battery and the second battery to the impact wrench.

13. The impact wrench according to claim 12, wherein the guide rails of the first battery dock and the second battery dock are oriented in a V-shape relative to each other with a top of the guide rails being spaced farther from each other than a bottom of the guide rails.

14. The impact wrench according to claim 1, further comprising a first rest surface adjacent to the first battery and extending outward at least to an outer surface of the first battery.

15. The impact wrench according to claim 14, wherein the first rest surface circumscribes a portion of at least two sides of the first battery.

16. The impact wrench according to claim 14, further comprising a second rest surface disposed on a lateral side of a front half of the impact wrench, the first rest surface being disposed on the lateral side of a rear half of the impact wrench, wherein the impact wrench can be laid on the lateral side and supported by the first and second rest surfaces without the first battery being contacted.

17. The impact wrench according to claim 16, wherein the first and second rest surfaces are coplanar.

18. The impact wrench according to claim 1, further comprising a motor drive circuit board disposed behind the motor, and an adjustable power regulator disposed adjacent to the motor drive circuit board, the adjustable power regulator comprising a permanent magnet and the motor drive circuit board comprising a Hall effect sensor thereon, the Hall effect sensor sensing a position of the adjustable power regulator and controlling the motor based thereon.

19. The impact wrench according to claim 1, wherein the first battery dock and the second battery dock are disposed within an extension of the cross-sectional profile from the motor to the handle.

20. The impact wrench according to claim 1, wherein each one of the first battery and the second battery includes a charge level display at a top surface of the respective battery, wherein the charge level displays face inward in relation to the longitudinal housing and face each other when the first battery and the second battery are coupled to the first battery dock and the second battery dock, respectively.

* * * * *